April 5, 1966    R. L. JENK    3,244,347
CORNER POST CONSTRUCTION
Filed Feb. 20, 1964    3 Sheets-Sheet 1
FIG. 1
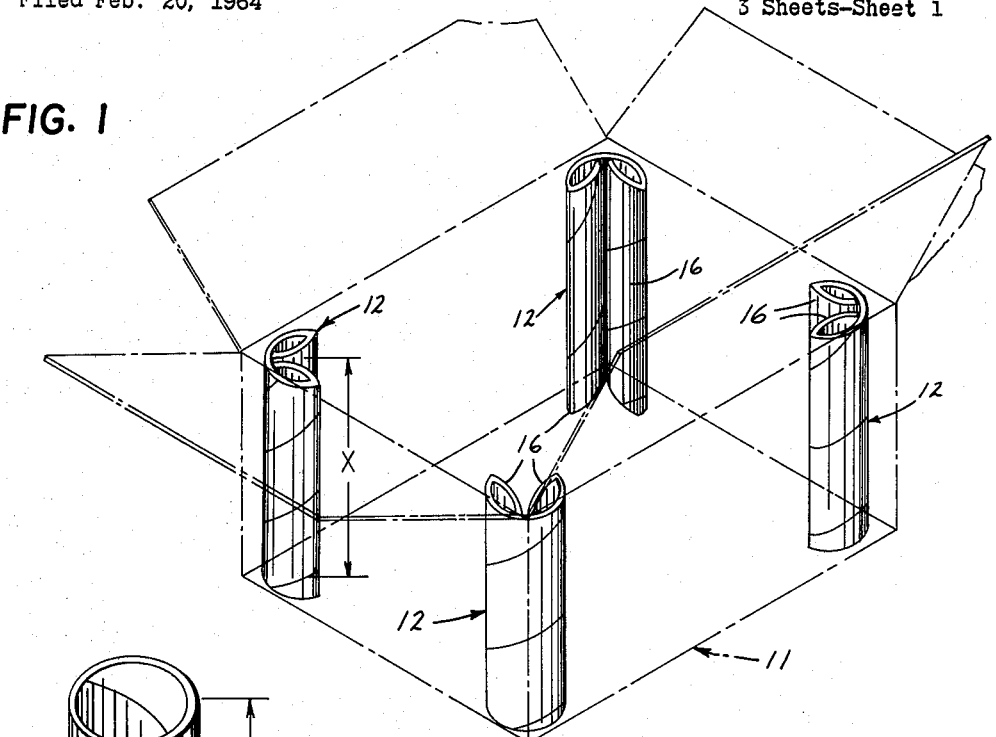
FIG. 2
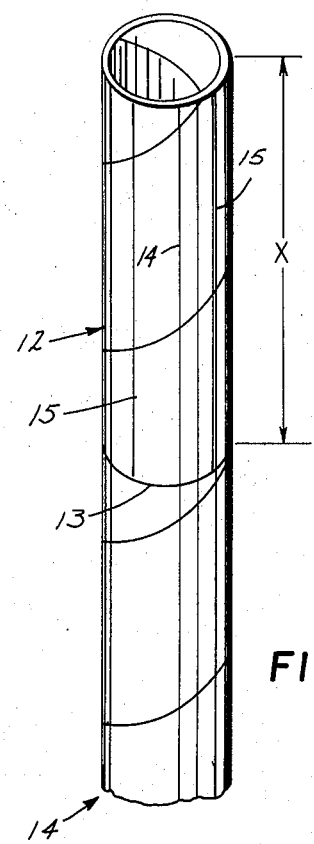
FIG. 3a
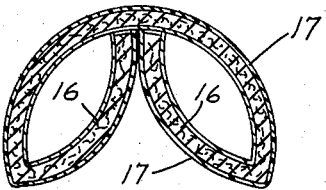
FIG. 3
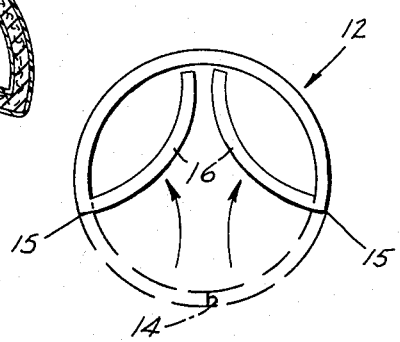
INVENTOR.
ROBERT L. JENK
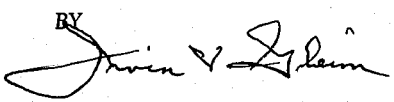
ATTORNEY

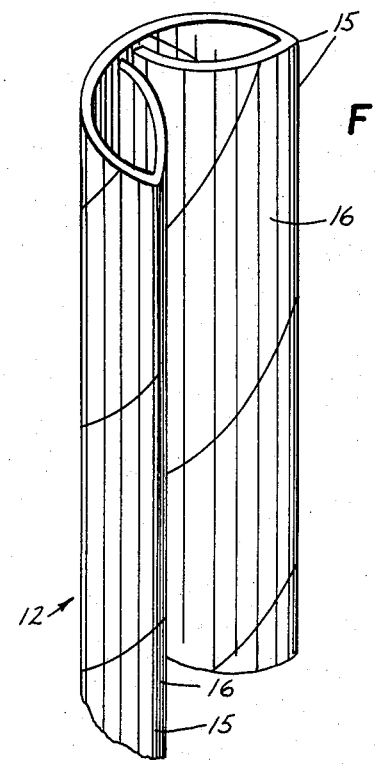
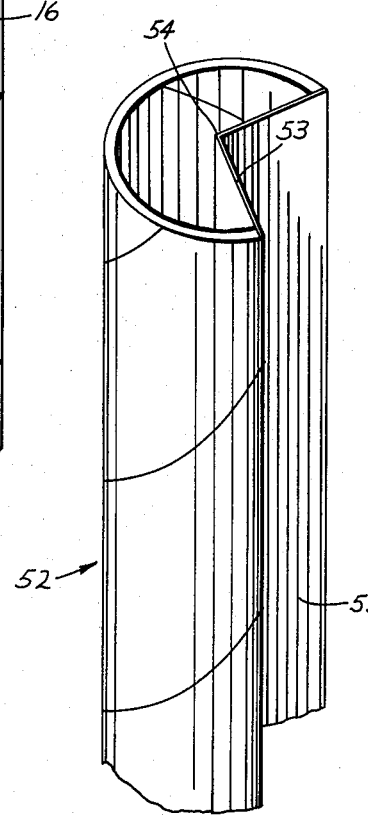
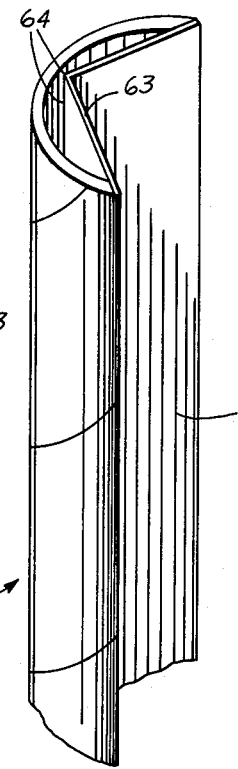

April 5, 1966   R. L. JENK   3,244,347
CORNER POST CONSTRUCTION
Filed Feb. 20, 1964   3 Sheets-Sheet 3

INVENTOR
ROBERT L. JENK

BY

ATTORNEY

United States Patent Office 3,244,347
Patented Apr. 5, 1966

3,244,347
CORNER POST CONSTRUCTION
Robert L. Jenk, Cincinnati, Ohio, assignor to The Mead Corporation, Dayton, Ohio, a corporation of Ohio
Filed Feb. 20, 1964, Ser. No. 346,150
9 Claims. (Cl. 229—14)

This application is a continuation-in-part of application Serial Number 100,350, filed Apr. 3, 1961, now Patent Number 3,129,868, granted Apr. 21, 1964.

This invention relates to novel corner post constructions for use in conjunction with containers to provide a relatively high and unexpected column compressive strength and/or cushioning for articles, including relatively heavy articles such as appliances, furniture, varied industrial equipment and the like.

Generally, there is provided a plurality of sections of fiberboard tubing, spiral or convolute wound, and of desired axial and transverse compressive strength, cut to desired lengths for forming corner posts in packing containers. Each tubular section is vertically slit and the edges thus produced are inturned to constitute a somewhat resilient shock absorbing or cushioning element into which the corner of an object which, for example, may be square cornered, will protectively fit. The tubular sections are desirably cut to a length to fit into a container whereby the sections will also greatly strengthen the compressive strength of the corners of the container.

Alternatively, one side of each tubular corner post can be variably cut away to receive in the gap thus formed an additional cushioning element in the shape of an angle bar and fabricated of corrugated cardboard or similar cushioning material.

The device may assume various cross sectional shapes as, for example, a square shape and, if desired, may be further strengthened and cushioned by a filler of, for example, foam polystyrene or the like. And the exterior of the device may be provided with a coating of polystyrene, or in the alternative, the device may be made of plastic material such as polystyrene or of other suitable plastic material other than polystyrene.

Present interior packing used in the container industry seriously lacks consistency, economy and quality. Also, interior packings are manufactured with slow and difficult techniques.

It is, accordingly, an object of the invention to provide corner post packing elements of simple, economical, consistent and highly effective construction.

It is another object of the invention to provide such elements which not only locate and protectively cushion the packed article in spaced relationship with the container walls, but also serve as reinforcing corner posts for the container, strengthening the corners thereof against deforming impact and compressive forces.

A further object of the invention is to provide a novel corner post element of the character set forth having a filler material incorporated therewith.

A still further object of the invention is to provide a device of the character set forth having a novel exterior coating of plastic material, or in the alternative to provide such a device from a suitable plastic material, as for example, polystyrene.

It is a further object to provide cushioning packing elements that are ideally constructed for receiving and holding additional angle bar-shaped strips of corrugated cardboard or other cushioning material embracing the corners of the packed article.

Other and further objects of the invention will become apparent from a reading of the following specification, taken in conjunction with the drawings, in which:

FIGURE 1 is a perspective view of a preferred embodiment of the invention;

FIGURE 2 is a perspective view of a spiral wrapped paperboard tube from which certain of the corner post elements of this invention may be cut;

FIGURE 3 is a plan view showing the shaping step for forming the cushioning corner post of FIGURE 1;

FIGURE 3A is a plan view in horizontal medial section of a plastic coated corner post;

FIGURE 4 is a perspective view of the corner post formed from the construction of FIGURE 3;

FIGURE 5 is a perspective view of a second form of corner post construction of this invention;

FIGURE 6 is a perspective view of another species of this invention;

Figure 7:
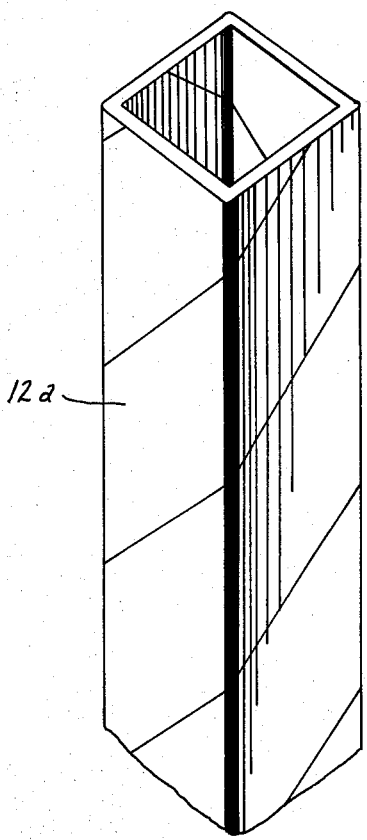
FIGURE 7 is a perspective view of another form the invention may assume.

With reference to FIGURES 1–4 of the drawings, numeral 11 generally designates a phantom shown rectangular carton into the corners of which have been inserted four compression-cushioning corner posts generally designated 12. Each corner post 12 is conveniently and economically formed by cutting off at line 13 a length x, FIGURES 1 and 2, of laminated paper board tube 14. Each piece of paperboard, or other suitably relatively stiff and somewhat resilient material, is desirably of a length substantially equal to the internal height of the container or carton 11 so as to strengthen the carton corners against deforming and potential content-damaging compressive forces, such as would result from high tiering of stacked containers. It will be understood that the length x may be the exact internal height of the container 11 or may be somewhat less than such internal height.

Next, each corner post 12 is slit vertically along line 14 and is scored along lines 15 parallel to slit 14 to define the longitudinally extending panels or wings 16, which are then bent inwardly about fold lines 15, as indicated by the arrows of FIGURE 3, to the positions thereof shown. If desired, post 12 may be exteriorly coated with a plastic material such as polyethylene or other well known non-abrasive materials, as indicated at 17 in FIGURE 3A, to provide additional strength, as well as protection against scuff or abrasive damage to the packaged article or articles. Cushioning post 12 is now ready for insertion into a corner of container 11, FIGURE 1, where its resilient wings 16 cushioningly embrace the margins of the corner portions of the packaged article or articles, now shown, at one corner of the article.

The semi-cylindrical portion of each post 12 resiliently and tangentially bridges the inner corner area of container 11 to further cushioningly space the packaged article or articles from the container. In the present embodiment, which is here discussed merely as a typical example and not as a limitation on this invention or other species thereof hereinafter described, the post of this invention may desirably be made of a plastic material such as polystyrene. Of course, other materials having combined cushioning, strengthening, padding, abrasive resistance and resistance to external compressive loading characteristics may be employed advantageously in the practice of the present invention, and they are intended to be comprehended within the scope thereof. For example, if so desired, the post, for example, post 12 may be made of any suitable board material such as laminated paperboard cardboard, corrugated paperboard or of plastic material other than polystyrene.

In the species of FIGURE 5, the cut length of tubing 52 is cut away longitudinally to leave a gap subtending an arc of approximately 90°. Into and bridging this gap is inserted an angularly bent strip 53 of cardboard, corrugated paperboard or other suitable material for cushioning, padding, abrasion resistance and strengthening or the like.

In the species of FIGURE 6, the piece of tubing 62 is cut away over a wider angle than in the modification of FIGURE 5. The FIGURE 6 species may be provided with an angularly bent strip 63 which permits its apex to extend to, or almost to, the bottom of the trough defined by tubular element 62. It should be noted that this modification of the invention can be economically employed by cutting each length of tubing into two equal halves to provide two semi-cylindrical posts for each cut length of tubing. And it is to be understood that in the forms of the invention shown in FIGURES 5 and 6, that a coating such as indicated at 17 in FIGURE 3A may be added, preferably by pre-treating the material forming the device.

The body of the corner post 12 need not be confined to the tubular shape illustrated in FIGURES 1 to 6 inclusive, but may assume other horizontal cross section configurations as, for example, the contour illustrated in FIGURE 7, wherein a corner post 12a is shown as being of square cross section area.

Figure 8:
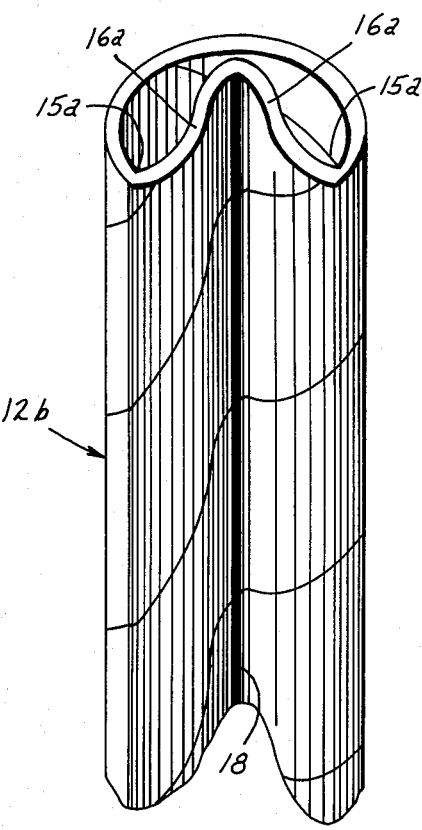
FIGURE 8 is a perspective view of a still further form of the invention.
Figure 9:
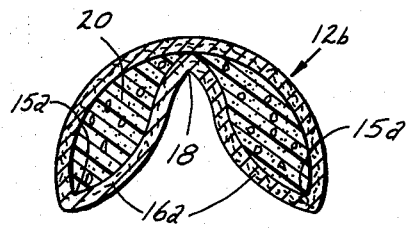
FIGURE 9 is a horizontal sectional view of the device shown in FIGURE 8 but illustrated with a further modification of the invention.

In the form of the invention illustrated in FIGURES 8 and 9, corner post 12b illustrated therein, is shown as having a cylindrical body similar to that shown in FIGURES 1–6, inclusive. However, instead of slit 14, there is provided a longitudinally extending score line with score lines 15a extending parallel thereto and at either side thereof on the inner face of the device. In this form of the invention, it will be apparent that the device may be folded or formed inwardly on score lines 15a, the score line 18 being on the outer face of the device, permitting such folding or bending. The wings 16a, thus formed, serve the purpose of cushioningly embracing the corner portions of the packed article or articles as hereinabove set forth with relation to the previously described forms of the invention.

A further modification of the invention is illustrated in FIGUURE 9, wherein, in the interior of any of the previously described corner posts having fully enclosed sides there is packed a filler of granular material 20 such as, for example, beaded or foamed polystyrene or the like. This filler provides additional strength and cushioning power to the corner post to which it is applied.

Accordingly, it will be recognized that the corner post constructions of this invention may be fabricated as by convolute winding or may be formed into substantially rectangular or square geometrical configurations by spiral or convolute winding.

In addition, the overall wall sectional thicknesses of the corner posts of this invention may be varied to provide the required degree of cushioning and compressive strength needed. Moreover, the cross-sectional dimensions of the corner posts may be varied to meet the cushioning and compression strength needed.

While the foregoing presents preferred embodiments of the present invention, it is obvious that other modifications and/or equivalents may be employed without departing from the scope of the invention, which is defined in the appended claims.

What is claimed is:
1. Combined cushioning and resistance to external compressive loading means for packing a polygonal article in spaced relation to the inner wall surfaces of a polygonal container, said means comprising:
a piece of at least somewhat resilient sheet material having a portion cylindrically curved about its longitudinal axis,
said sheet material being vertically cut away to define a gap and having outer surfaces adapted to tangentially engage and bridge the corners of said container,
a resilient cushioning strip of angular horizontal cross sectional area inserted into and bridging said gap and adapted to embrace the corners of said article packed in said container,
whereby cushioning and resistance to compression loading is provided for said article.
2. Structure according to claim 1, said sheet material having a portion cylindrically curved about its longitudinal axis through an arc of the order of 180°.
3. Structure according to claim 1, said sheet material being vertically cut away to define a gap subtending an arc of approximately 90°.
4. Structure according to claim 1, said cushioning strip extending inwardly of said cylindrically curved sheet material at least to substantially the mid portion of the inner surface thereof.
5. Structure according to claim 1, said cylindrically curved sheet material and said cushioning strip being of lengths approximating the dimension of the article to be packaged.
6. Structure according to claim 1 in which said sheet material and said cushioning strip consists of paperboard.
7. Structure according to claim 6 in which at least one surface of said sheet material is coated with a plastic material.
8. Structure according to claim 1 in which said sheet material consists of polystyrene.
9. Structure according to claim 1 wherein said sheet material is a plastic material.

References Cited by the Examiner

UNITED STATES PATENTS

| | | | |
|---|---|---|---|
| 974,871 | 11/1910 | Ferres. | |
| 1,875,497 | 9/1932 | Richardson et al. | 229—14 |
| 2,019,778 | 11/1935 | Enholm et al. | |
| 2,575,898 | 11/1951 | Tadinger | 229—14 |
| 2,654,473 | 10/1953 | Pierce | 206—65 |
| 2,733,851 | 2/1956 | Van Ness | 229—14 |
| 2,795,366 | 6/1957 | Magill. | |
| 2,961,141 | 11/1960 | Lukes | 229—14 |
| 3,001,105 | 9/1961 | Fox | 206—46 X |
| 3,035,825 | 5/1962 | Weller | 206—46 X |

FOREIGN PATENTS 210,348   7/1960   Austria.

GEORGE O. RALSTON, *Primary Examiner.*
FRANKLIN T. GARRETT, JOSEPH R. LECLAIR, *Examiners.*